US012349821B1

(12) United States Patent
Yang

(10) Patent No.: US 12,349,821 B1
(45) Date of Patent: Jul. 8, 2025

(54) FOLDABLE DIATOMACEOUS FLOOR MAT AND PREPARATION METHOD THEREOF

(71) Applicant: Hongyuan Yang, Dongtai (CN)

(72) Inventor: Hongyuan Yang, Dongtai (CN)

( * ) Notice: Subject to any disclaimer, the term of this patent is extended or adjusted under 35 U.S.C. 154(b) by 0 days.

(21) Appl. No.: 19/083,765

(22) Filed: Mar. 19, 2025

(51) Int. Cl.
*A47G 27/02* (2006.01)
*H05B 3/34* (2006.01)

(52) U.S. Cl.
CPC ............... *A47G 27/02* (2013.01); *H05B 3/34* (2013.01)

(58) Field of Classification Search
CPC .................................. A47G 27/02; H05B 3/34
USPC .......................................................... 219/201
See application file for complete search history.

(56) References Cited

U.S. PATENT DOCUMENTS

2019/0374069 A1* 12/2019 Klug ...................... A47K 3/002
2020/0245845 A1* 8/2020 Klug ....................... A47L 19/02
2021/0330110 A1* 10/2021 Klug ......................... B32B 3/06

* cited by examiner

*Primary Examiner* — Eric S Stapleton
(74) *Attorney, Agent, or Firm* — Birchwood IP

(57) ABSTRACT

A foldable diatomaceous floor mat and a preparation method thereof are provided, the foldable diatomaceous floor mat includes a mat component, the mat component includes a bag body, sewing tapes, mat pockets, diatomaceous subplates, and an air outlet duct. The present disclosure arranges a plurality of diatomaceous subplates provided in different mat pockets, and adjacent diatomaceous subplates can be flipped by the sewing tapes to achieve folding function, thereby adapting to different placement environments. By forming a reinforcing mesh in X, Y, and Z directions through longitudinal ducts, transverse ducts, and vertical duct, diatomaceous earth is wrapped around a periphery of the reinforcing mesh, greatly improving the structural strength of the diatomaceous subplates. By placing the diatomaceous subplates and box body in the mat pockets, the wear on the diatomaceous subplates can be reduced, and the service life of the floor mat can be increased.

10 Claims, 8 Drawing Sheets

1

2

4

5

6

7

FOLDABLE DIATOMACEOUS FLOOR MAT AND PREPARATION METHOD THEREOF

TECHNICAL FIELD

The present disclosure relates to the field of diatomaceous floor mat technologies, and in particular, to a foldable diatomaceous floor mat and a preparation method thereof.

BACKGROUND

Diatom mud, as an environmentally friendly decorative wall material with diatomaceous earth as the core raw material, integrates excellent functions such as formaldehyde elimination, air purification, water absorption and moisture retention, humidity regulation, release of negative oxygen ions, fire resistance and flame retardancy, wall self-cleaning, sterilization and deodorization. Its healthy and environmentally friendly characteristics render it both decorative and functional, and it has become a new favorite for indoor decoration to replace wallpaper and latex paint. It also shows certain application potential in the field of anti-slip floor mats.

In the existing technology, natural diatomaceous earth has strong adsorption properties and can quickly absorb water and dry after bathing. The upper and lower diatomaceous earth plates are bonded with steel wire mesh and flame-retardant adhesive, which has a stable structure, high strength, and durability. However, upon further investigation, it was found that there are significant flaws that cannot be ignored as follows.

The diatomaceous floor mat lacks flexibility in design and cannot achieve folding function. Considering that the placement area of the mat varies in actual use scenarios, this fixed form greatly limits its applicability and greatly reduces its practicality.

The internal steel wire mesh is only laid out on a single plane, without longitudinal steel wire support, resulting in poor performance of the overall structural strength of the floor mat under multi-dimensional stress, rendering it difficult to withstand large external impact or deformation pressure during long-term use.

Diatomaceous earth is directly exposed to the outside, and during long-term use, it is inevitably subjected to frequent physical effects such as friction and collision, which can easily damage the surface and seriously shorten the service life of the floor mat, thereby increasing the frequency and cost of replacement.

When diatomaceous earth reaches saturation with water absorption, relying solely on natural air drying for drying not only takes a long time, but also has extremely low drying efficiency, seriously affecting the continuous use performance of the floor mat and causing great inconvenience to users.

Therefore, a foldable diatomaceous floor mat and a preparation method thereof are proposed.

SUMMARY

In view of this, the present disclosure aims to provide a foldable diatomaceous floor mat and a preparation method thereof to solve or alleviate the technical problems existing in the prior art, and at least provide a beneficial option.

To solve the above technical problems, a technical solution adopted in the present application is: a foldable diatomaceous floor mat, including a mat component, where the mat component includes a bag body, sewing tapes, mat pockets, diatomaceous subplates, a planer reinforcing mesh, longitudinal ducts, transverse ducts, a box body, connection holes, a vertical duct, an installation groove, a blowing fan, and an air outlet duct;

an interior of the bag body is divided into a plurality of mat pockets by a plurality of sewing tapes, and inner walls of the plurality of mat pockets are all connected to the diatomaceous subplates; interiors of the diatomaceous subplates are provided with the planer reinforcing mesh, and the planer reinforcing mesh is composed of a plurality of longitudinal ducts and a plurality of transverse ducts; the plurality of longitudinal ducts and the plurality of transverse ducts are arranged in a crisscross manner, front surfaces of the diatomaceous subplates are fixedly connected to the box body, and an outer side wall of the box body is connected to fronts of inner side walls of the mat pockets; a rear surface of the box body is provided with a plurality of connection holes, and front surfaces of the plurality of longitudinal ducts are respectively passed through interiors of the plurality of connection holes, rear surfaces of the plurality of longitudinal ducts are all penetrated through rear surfaces of the diatomaceous subplates, two ends of the plurality of transverse ducts are respectively penetrated through two sides of the diatomaceous subplates; intersections of the longitudinal ducts and the transverse ducts are communicated to each other, intersections of the longitudinal ducts and the transverse ducts are communicated to the vertical duct; two ends of the vertical duct are respectively penetrated through upper and lower surfaces of the diatomaceous subplates; the installation groove is provided in a middle of a front surface of the box body, and an inner side wall of the installation groove is fixedly connected to the blowing fan, an air outlet end of the blowing fan is communicated to the air outlet duct, and front surfaces of the plurality of longitudinal ducts are all communicated to an outer side wall of the air outlet duct.

In some embodiments of the present disclosure, upper and lower parts of the diatomaceous subplates near the planer reinforcing mesh are provided with a heating wire mesh, and a box cover is fixedly connected to an upper surface of the box body; one side of an upper surface of the box cover is provided with an installation hole, and an inner side wall of the installation hole is fixedly connected to a controller; an input end of the heating wire mesh is electrically connected to an output end of the controller.

In some embodiments of the present disclosure, an input end of the blowing fan is electrically connected to the output end of the controller.

In some embodiments of the present disclosure, two sides of an upper surface of the controller are respectively provided with a blowing button and a heating button.

In some embodiments of the present disclosure, a charging power source is provided on one side of an inner side wall of the box cover away from the controller, and an output terminal of the charging power source is electrically connected to an input terminal of the controller.

In some embodiments of the present disclosure, a sealing ring is fixedly connected to inner side walls of the connection holes, an inner side wall of the sealing ring is attached to outer walls of the longitudinal ducts near one end of the air outlet duct.

In some embodiments of the present disclosure, middles of front surfaces of the mat pockets are provided with a mat pocket opening, an inner wall of the mat pocket opening is fixedly connected with an opening and closing zipper.

In some embodiments of the present disclosure, the bag body is made of ultra-fine elastic fibers that includes imitation microfiber PU leather fabric.

To solve the above technical problems, another technical solution adopted in this application is a method for preparing a foldable diatomaceous floor mat, including the following steps:

- step 1: obtaining diatomaceous floor material and imitation microfiber PU leather fabric;
- step 2: cutting the imitation microfiber PU leather fabric according to a design size, and sewing cut imitation microfiber PU leather fabric to form a main structure of the bag body;
- step 3: dividing the bag body into a plurality of mat pockets having equal size by using a plurality of sewing tapes at predetermined intervals on the bag body;
- step 4: providing a mat pocket opening in a middle of a front surface of each mat pocket, and sewing an opening and closing zipper onto the mat pocket opening;
- step 5: cutting longitudinal ducts and transverse ducts with appropriate lengths according to sizes of the diatomaceous subplates, assembling them in a cross manner, and connecting intersections of the longitudinal ducts and transverse ducts to form a planar grid structure;
- step 6: installing the vertical duct at intersections of the longitudinal ducts and the transverse ducts, communicating the longitudinal ducts and the transverse ducts;
- step 7: filling prepared diatomaceous floor material into a mold surrounding the planer reinforcing mesh, and laying a heating wire mesh inside the diatomaceous floor material near upper and lower parts of the planer reinforcing mesh while filling the diatomaceous floor material;
- step 8: compacting and shaping the mold filled with diatomaceous earth to form the diatomaceous subplates, then curing or drying to stabilize the diatomaceous earth and removing it;
- step 9: fixing the blowing fan in the installation groove in a middle of the front surface of the box body, connecting the air outlet duct to the air outlet end of the blowing fan, and communicating a plurality of longitudinal ducts through the connection holes on the box body to the air outlet duct at the same time;
- step 10: fixing a controller in an installation hole on one side of an upper surface of the box cover, and connecting input terminals of the heating wire mesh and the blowing fan to an output terminal of the controller.

In some embodiments of the present disclosure, when the plurality of longitudinal ducts are simultaneously passed through the connection holes on the box body, a sealing ring is provided on inner side walls of the connection holes, and the longitudinal ducts are passed through the sealing ring, so that an inner wall of the sealing ring is tightly adhered to outer side walls of the longitudinal ducts.

The embodiments of the present disclosure have the following advantages due to the adoption of the above technical solutions.

The present disclosure sets a plurality of diatomaceous subplates in different mat pockets, and adjacent diatomaceous subplates can be flipped by the sewing tapes to achieve folding function and adapt to different placement environments.

The present disclosure forms a reinforcing mesh in the X, Y, and Z directions through the longitudinal ducts, the transverse ducts, and the vertical duct, covering the periphery of the reinforcing mesh with diatomaceous earth, thereby greatly improving the structural strength of the diatomaceous subplates.

The present disclosure reduces the wear on the diatomaceous subplates by placing the diatomaceous subplates and box body in the mat pockets, thereby increasing the service life of the diatomaceous subplates, and reducing the frequency and cost of mat replacement.

The present disclosure uses a blowing fan to blow air into the longitudinal ducts, and blows air from the openings of the longitudinal ducts, transverse ducts, and vertical duct towards the periphery of the diatomaceous subplates, thereby quickly drying the bag body and also drying the surface of the diatomaceous subplates, improving the continuous use performance of the floor mat.

The above overview is only for the purpose of the specification and is not intended to be limiting in any way. In addition to the illustrative aspects, embodiments, and features described above, further aspects, embodiments, and features of the present disclosure will be easily understood by referring to the accompanying drawings and the following detailed description.

BRIEF DESCRIPTION OF DRAWINGS

In order to provide a clearer explanation of the embodiments of the present application or the technical solutions in the prior art, a brief introduction will be given to the accompanying drawings required for the embodiments or the technical description. It is obvious that the accompanying drawings described below are only some embodiments of the present application. For those skilled in the art, other drawings can be obtained based on these drawings without creative work.

Numeral reference: 1—mat component; 11—bag body; 12—sewing tape; 13—mat pocket; 14—diatomaceous subplate; 15—planer reinforcing mesh; 16—longitudinal duct; 17—transverse duct; 18—box body; 19—connection hole; 20—vertical duct; 21—installation groove; 22—blowing fan; 23—air outlet duct; 24—heating wire mesh; 25—box cover; 26—installation hole; 27—controller; 28—blowing button; 29—heating button; 30—charging power source; 31—sealing ring; 32—mat pocket opening; 33—opening and closing zipper.

DESCRIPTION OF EMBODIMENTS

In the following description, only some exemplary embodiments are briefly described. As understood by those skilled in the art, the described embodiments can be modified in various ways without departing from the spirit or scope of the present disclosure. Therefore, the figures and descriptions are considered to be exemplary rather than limitation in nature.

Below, the embodiments of the present disclosure will be described in detail with reference to the accompanying drawings.

Figure 1:
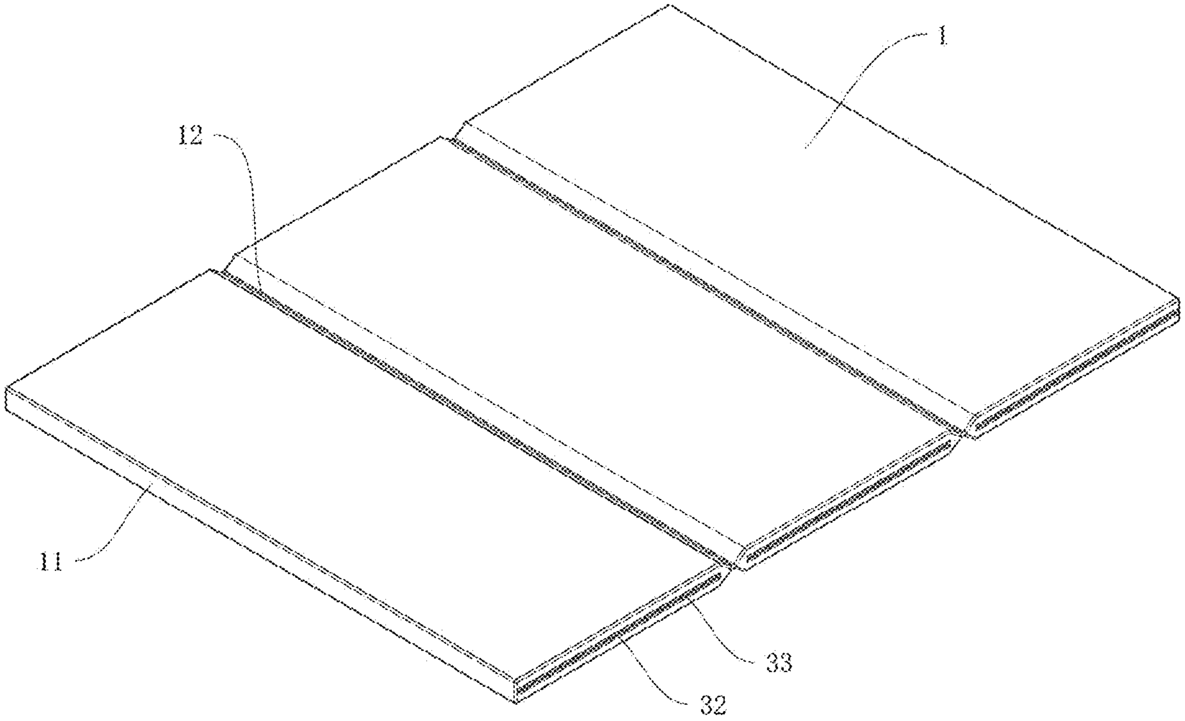
FIG. 1 is a schematic diagram of an overall structure of the present disclosure.
Figure 2:
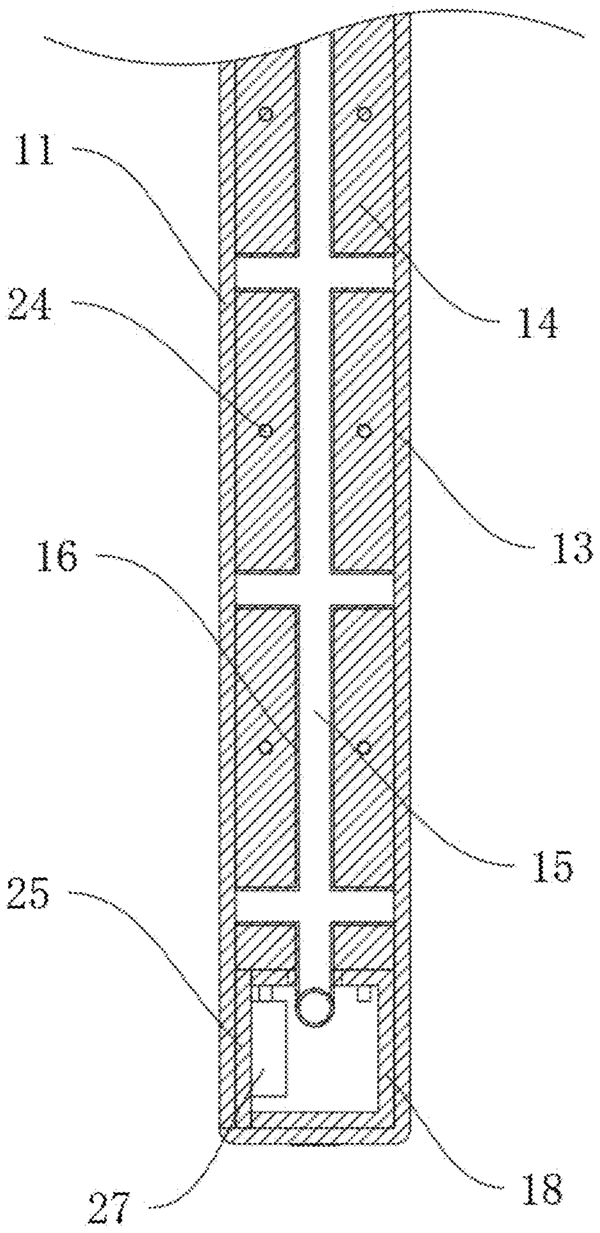
FIG. 2 is a schematic diagram of a partial sectional structure of a mat pocket of the present disclosure.
Figure 3:
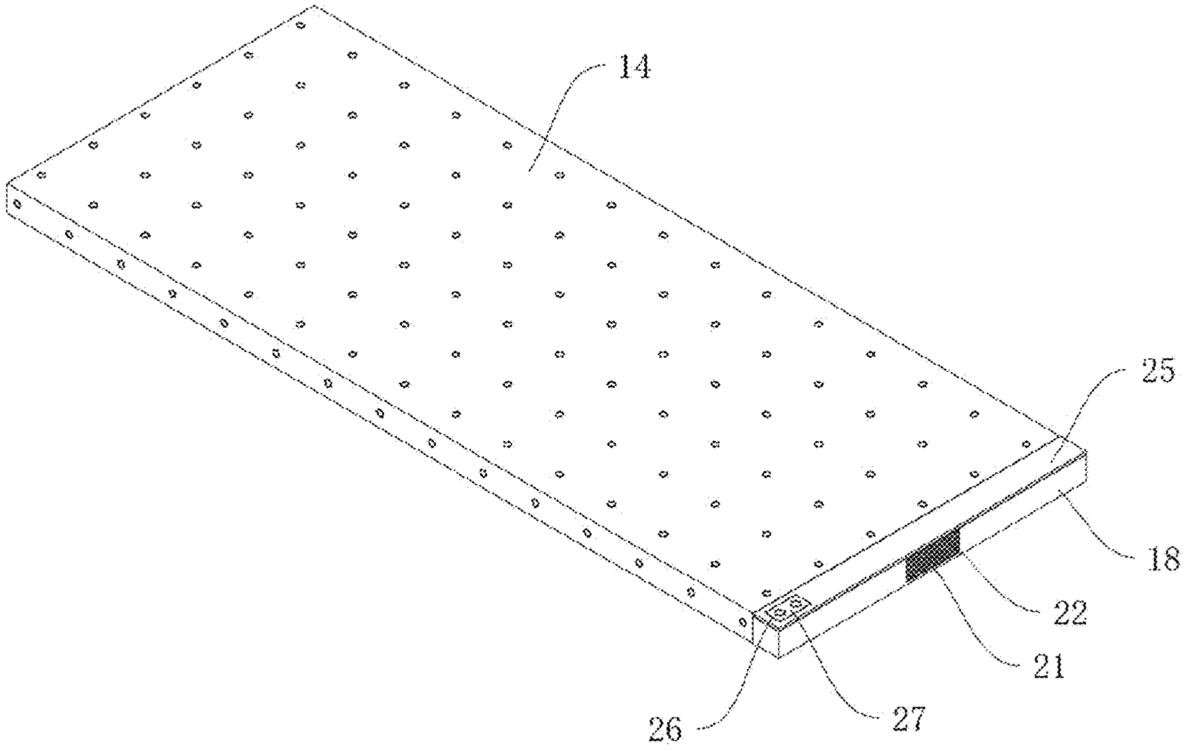
FIG. 3 is a schematic structural diagram of a diatomaceous subplate and a box body of the present disclosure.
Figure 4:
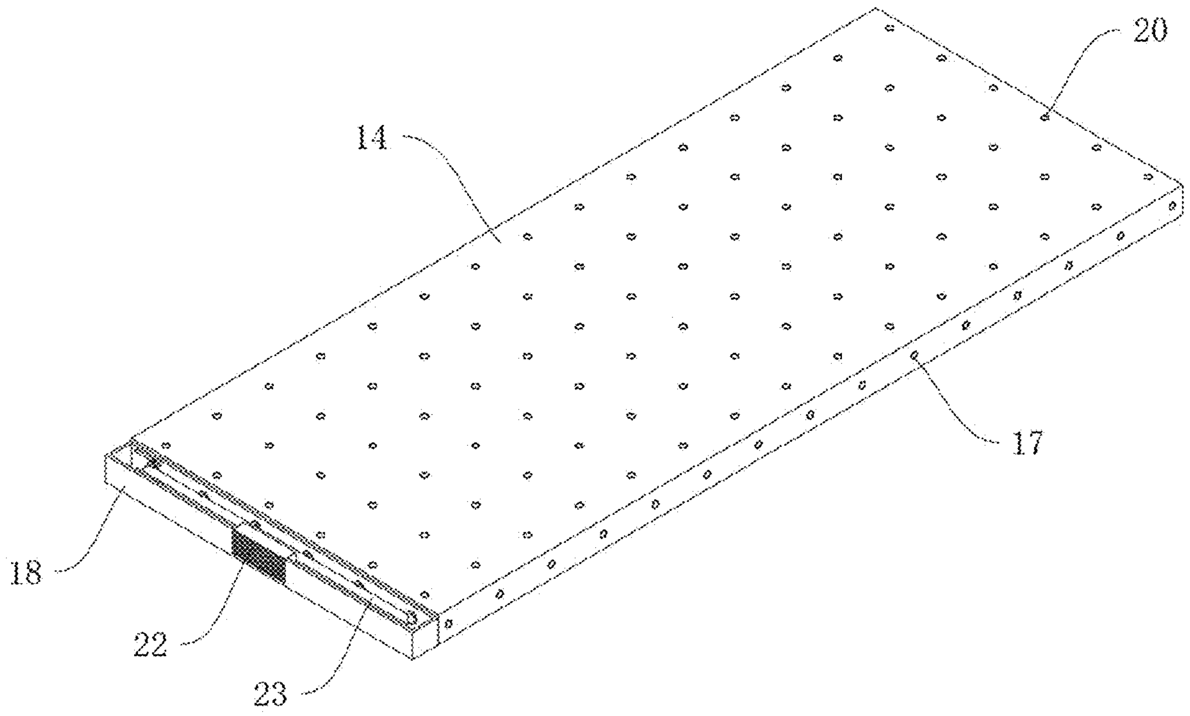
FIG. 4 is a schematic structural diagram of an air outlet duct and a sealing ring of the present disclosure.
Figure 5:
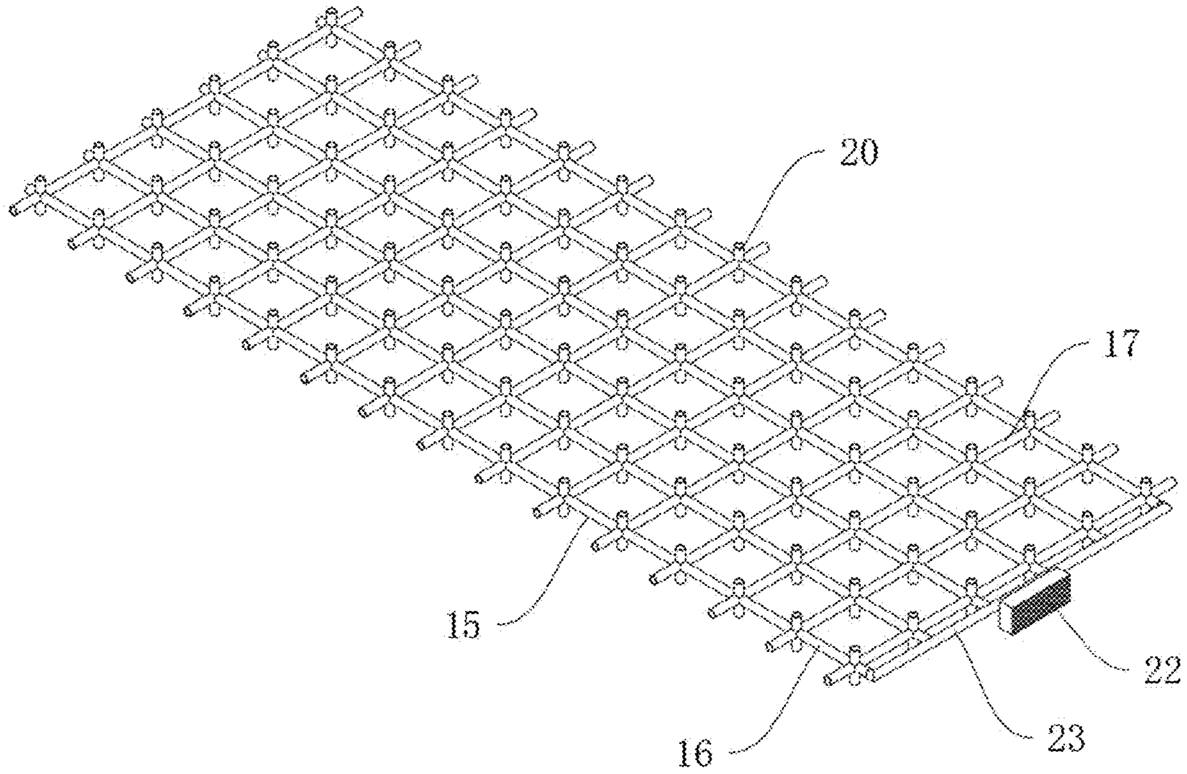
FIG. 5 is a schematic structural diagram of a planer reinforcing mesh and a blowing fan of the present disclosure.
Figure 6:
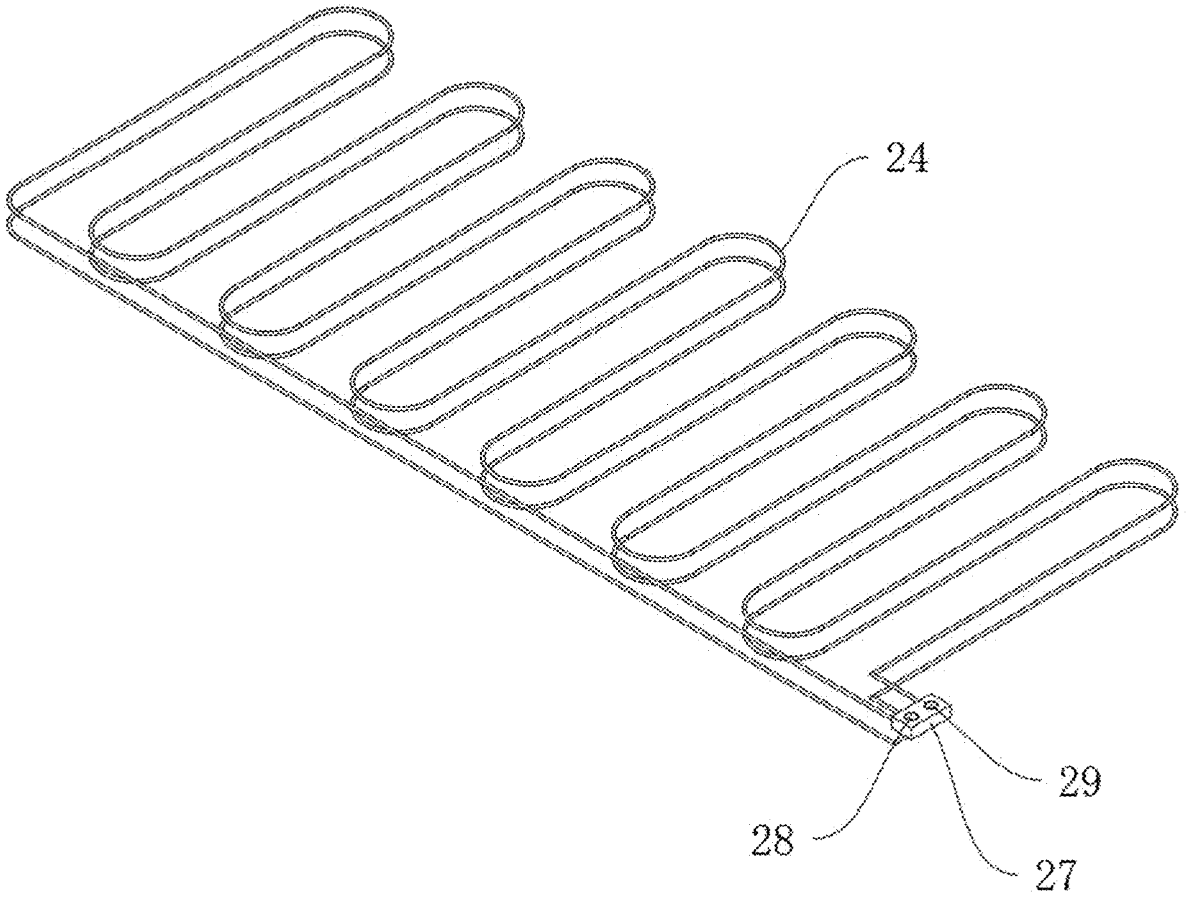
FIG. 6 is a schematic structural diagram of a heating wire mesh and a controller of the present disclosure.
Figure 7:
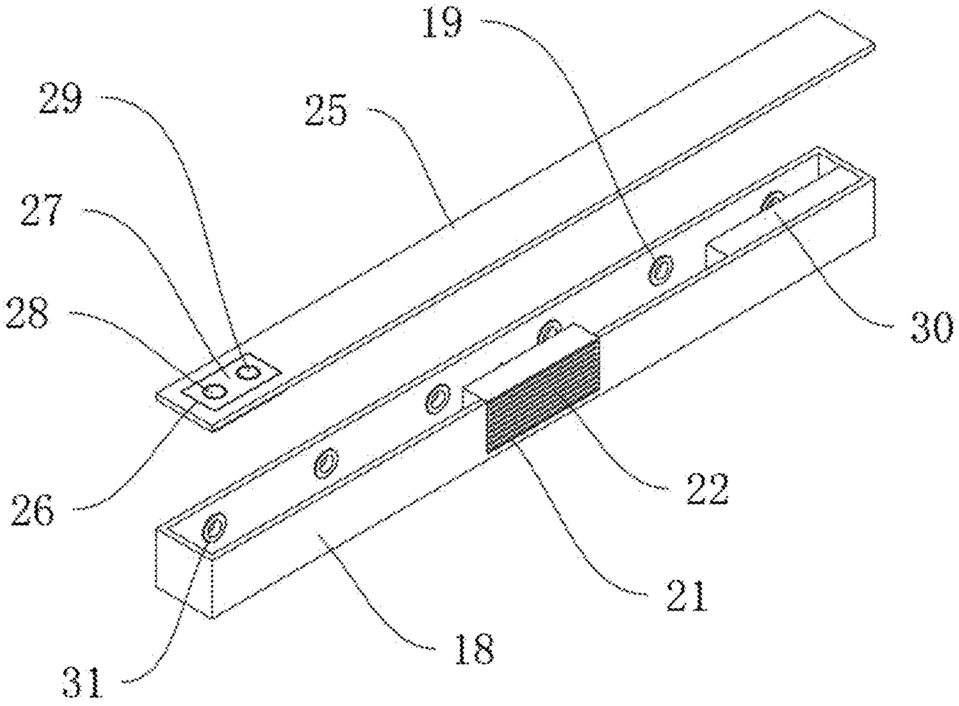
FIG. 7 is a schematic structural diagram of a box body and a box cover of the present disclosure.

FIG. 1 is a schematic diagram of an overall structure of a foldable diatomaceous floor mat according to an embodiment of the present application, as shown in FIGS. 1-7. The embodiment of the present disclosure provides a foldable diatomaceous floor mat, including a mat component 1. The mat component 1 includes a bag body 11, sewing tapes 12, mat pockets 13, diatomaceous subplates 14, a planer reinforcing mesh 15, longitudinal ducts 16, transverse ducts 17, a box body 18, connection holes 19, a vertical duct 20, an installation groove 21, a blowing fan 22, and an air outlet duct 23.

An interior of the bag body 11 is divided into a plurality of mat pockets 13 by a plurality of sewing tapes 12; inner side walls of the plurality of mat pockets 13 are all connected to the diatomaceous subplates 14, and the planer reinforcing mesh 15 is provided in the diatomaceous subplates 14. The planer reinforcing mesh 15 is composed of a plurality of longitudinal ducts 16 and a plurality of transverse ducts 17, which are arranged in a crisscross manner. Front surfaces of the diatomaceous subplates 14 are fixedly connected to the box body 18, and an outer side wall of the box body 18 is connected to fronts of inner side walls of the mat pockets 13. A rear surface of the box body 18 is provided with a plurality of connection holes 19, and front surfaces of the plurality of longitudinal ducts 16 are respectively penetrated interiors of the plurality of connection holes 19. Rear surfaces of the plurality of longitudinal ducts 16 run through back surfaces of the diatomaceous subplates 14, and two ends of the plurality of transverse ducts 17 are respectively passed through two sides of the diatomaceous subplates 14. At intersections of the longitudinal ducts 16 and the transverse ducts 17, they communicate to each other. The vertical duct 20 is connected at the intersections of the longitudinal ducts 16 and the transverse ducts 17. Two ends of the vertical duct 20 are respectively passes through upper and lower surfaces of the diatomaceous subplates 14. The installation groove 21 is provided in a middle of a front surface of the box body 18. An inner side wall of the installation groove 21 is fixedly connected to the blowing fan 22, an outlet end of the blowing fan 22 is connected to an air outlet duct 23. Front surfaces of the plurality of longitudinal ducts 16 are all connected to an outer side wall of the air outlet duct 23; where the bag body 11 serves as an external wrapping structure of the floor mat, which is a basic frame of the entire floor mat. Its internal space is divided into a plurality of mat pockets 13 by a plurality of sewing tapes 12. The purpose of using the sewing tapes 12 is to divide the interior of the bag body 11 into a plurality of independent spaces for subsequent installation and placement of other components. The mat pockets 13 provide a location for placing the diatomaceous subplates 14. And the diatomaceous subplates 14 are one of core functional components of the floor mat, which utilizes the characteristics of diatomaceous earth, such as adsorption and humidity regulation, to perform its main functions. The planer reinforcing mesh 15 is provided in the diatomaceous subplates 14, consisting of a plurality of longitudinal ducts 16 and a plurality of transverse ducts 17. This cross structure forms the planer reinforcing mesh 15, thereby providing structural strength on the plane for the diatomaceous subplates 14, enhancing its compressive and deformation resistance. The vertical duct 20 is provided at the intersections of the longitudinal ducts 16 and the transverse ducts 17, cooperating with the longitudinal ducts 16 and the transverse ducts 17 to render the planer reinforcing mesh have a three-dimensional structure, further enhancing the structural strength and stability of the diatomaceous subplates 14 in different directions, and also serving as a vertical air circulation channel. The blowing fan 22 is a key component for the ventilation function of the floor mat. When it is necessary to dry or ventilate the diatomaceous subplates 14 and its external bag body 11, the blowing fan 22 can generate airflow. The airflow can enter the longitudinal ducts 16 through the air outlet duct 23, and then spread to the entire interior of the bag body 11 through the duct system, thereby achieving the drying or ventilation treatment of the diatomaceous subplates 14 and the bag body 11, using the flow of airflow to take away moisture or update air, ensuring the good performance of the floor mat. By combining a plurality of components such as the bag body 11, the diatomaceous subplates 14, the duct system, and the box body 18, the functionality of diatomaceous earth is utilized, and the structural strength is enhanced by the reinforcing mesh and the duct system. At the same time, the drying and ventilation functions of the diatomaceous subplates 14 and the bag body 11 are achieved by using the blowing fan 22 and the duct system, rendering the floor mat more functional, structurally stable, and practical.

In an implementation mode, interiors of the diatomaceous subplates 14 are provided with a heating wire mesh 24 near upper and lower parts of the planar reinforcing mesh 15. An upper surface of the box body 18 is fixedly connected to a box cover 25, and one side of an upper surface of the box cover 25 is provided with an installation hole 26. An inner side wall of the installation hole 26 is fixedly connected to a controller 27, an input end of the heating wire mesh 24 is electrically connected to an output end of the controller 27. Where the main function of the heating wire mesh 24 is to provide auxiliary heating function. When the diatomaceous subplates 14 absorb a lot of moisture or is in a relatively humid environment, relying solely on the blowing fan 22 for ventilation and drying may not be efficient. At this time, the heating wire mesh 24 can play an important role. The heating wire mesh 24 can increase the temperature of the diatomaceous subplates 14 and accelerate the evaporation rate of moisture through heating, thereby improving the drying efficiency. At the same time, the heating wire mesh 24 is placed near upper and lower parts of the planer reinforcing mesh 15. On the one hand, it can fully utilize the structure of the planer reinforcing mesh to uniformly heat the interiors of the diatomaceous subplates 14. On the other hand, it also avoids interference with the functions of diatomaceous earth itself, ensuring that diatomaceous earth can function normally, such as adsorption and humidity regulation, releasing negative oxygen ions and other functions. By introducing the heating wire mesh 24 and the controller 27, the floor mat can not only achieve ventilation and drying, but also provide a user with more diversified drying methods through heating and drying. At the same time, the controller 27 enables convenient operation and precise control of the heating function, thereby improving the user experience and overall performance of the floor mat.

In an implementation mode, an input terminal of the blowing fan 22 is electrically connected to an output terminal of the controller 27. Through the controller 27, a user can adjust a working state of the blowing fan 22 according to different usage scenarios and needs, such as adjusting operating parameters of the blowing fan 22 such as wind speed and air volume. When the user find that diatomaceous subplates 14 absorb a lot of moisture and needs to be quickly dried, he can increase the wind speed and air volume of the blowing fan 22 by operating the controller 27, thereby accelerating the air flow, and rendering the airflow pass through the longitudinal ducts 16, the transverse ducts 17, and the vertical duct 20 more quickly, in order to achieve the purpose of quickly drying the diatomaceous subplates 14. In daily maintenance or situations where strong drying is not required, the power of the blowing fan 22 can be reduced to achieve low-energy operation, ensuring that the floor mat is in a suitable dry state while saving energy.

In an implementation mode, an upper surface of the controller 27 is provided with a blowing button 28 and a heating button 29 on two sides. Since the bag body 11 is soft, there is no need to remove the box body 18 and the diatomaceous subplates 14. The positions of the blowing button 28 and the heating button 29 can be accurately located by touch and opened or closed.

In an implementation mode, a charging power supply 30 is provided on one side of an inner side wall of the box cover 25 away from the controller 27, and an output terminal of the charging power supply 30 is electrically connected to an input terminal of the controller 27. By connecting the output terminal of the charging power supply 30 to the input terminal of the controller 27, power can be effectively transmitted from the charging power supply 30 to the controller 27, and then reasonably distributed to other components that require power through the controller 27. In this way, the user can easily manage and control power distribution of the charging power supply 30 through the controller 27. According to different usage needs, such as starting the blowing fan 22 for ventilation and drying or turning on the heating wire mesh 24 for heating and drying, without relying on external wires or power sockets, rendering the use of the diatomaceous floor mat more convenient and freer, meeting the user's usage needs in different scenarios, and improving the practicality and applicability of the product.

In an implementation mode, inner walls of the connection holes 19 are fixedly connected with a sealing ring 31, and an inner wall of the sealing ring 31 is attached to one end of the outer side walls of the longitudinal ducts 16 near the air outlet duct 23. The sealing ring 31 seals a connection between the longitudinal ducts 16 and the box body 18, thereby effectively blocking moisture from entering an interior of the box body 18 through the connection holes 19, avoiding damage to electrical components inside the box body 18 due to moisture entering, such as the blowing fan 22 and the controller 27, thereby ensuring a normal operation and service life of the floor mat.

In an implementation mode, middles of the front surfaces of the mat pockets 13 are provided with a mat pocket opening 32, and an inner side wall of the mat pocket opening 32 is fixedly connected with an opening and closing zipper 33. By pulling the opening and closing zipper 33, the mat pocket opening 32 can be opened, rendering it easy to inspect, clean or replace the diatomaceous subplates 14. The operation is simple and fast, thereby providing convenience for the long-term use and maintenance of the floor mat, which helps to extend its service life and maintain its good performance.

In an implementation mode, the bag body 11 is made of ultra-fine elastic fibers that includes imitation microfiber PU leather fabric. The ultra-fine elastic fibers endow the bag body 11 with good flexibility and elasticity, enabling it to adapt to different usage scenarios and external forces. Under frequent folding, unfolding, and daily squeezing, friction, etc., it can still maintain the integrity of the structure and is not easily damaged or deformed, effectively extending the overall service life of the floor mat. The imitation microfiber PU leather fabric has a certain degree of wear resistance, which can resist the scratching and abrasion of external objects, maintain a good appearance and texture on the surface of the bag body 11 during long-term use, ensuring the stable function of the floor mat, and providing the user with a more reliable and durable user experience.

In summary, the embodiments of the present disclosure provide a foldable diatomaceous floor mat, which is composed by a unique bag body 11, mat pockets 13, and a duct system. It is not only convenient to fold and use according to the usage space, but also greatly enhances the structural strength and stability through the reinforcing mesh composed of a planer surface and the vertical duct 20. The added heating wire mesh 24 and blowing fan 22, combined with the controller 27, can flexibly adjust the wind speed, air volume, and heating function, thereby providing diversified drying methods, efficiently responding to humid conditions and saving energy. It performs excellently in functionality, stability, and practicality, and can effectively meet the diverse needs of the user.

Figure 8:
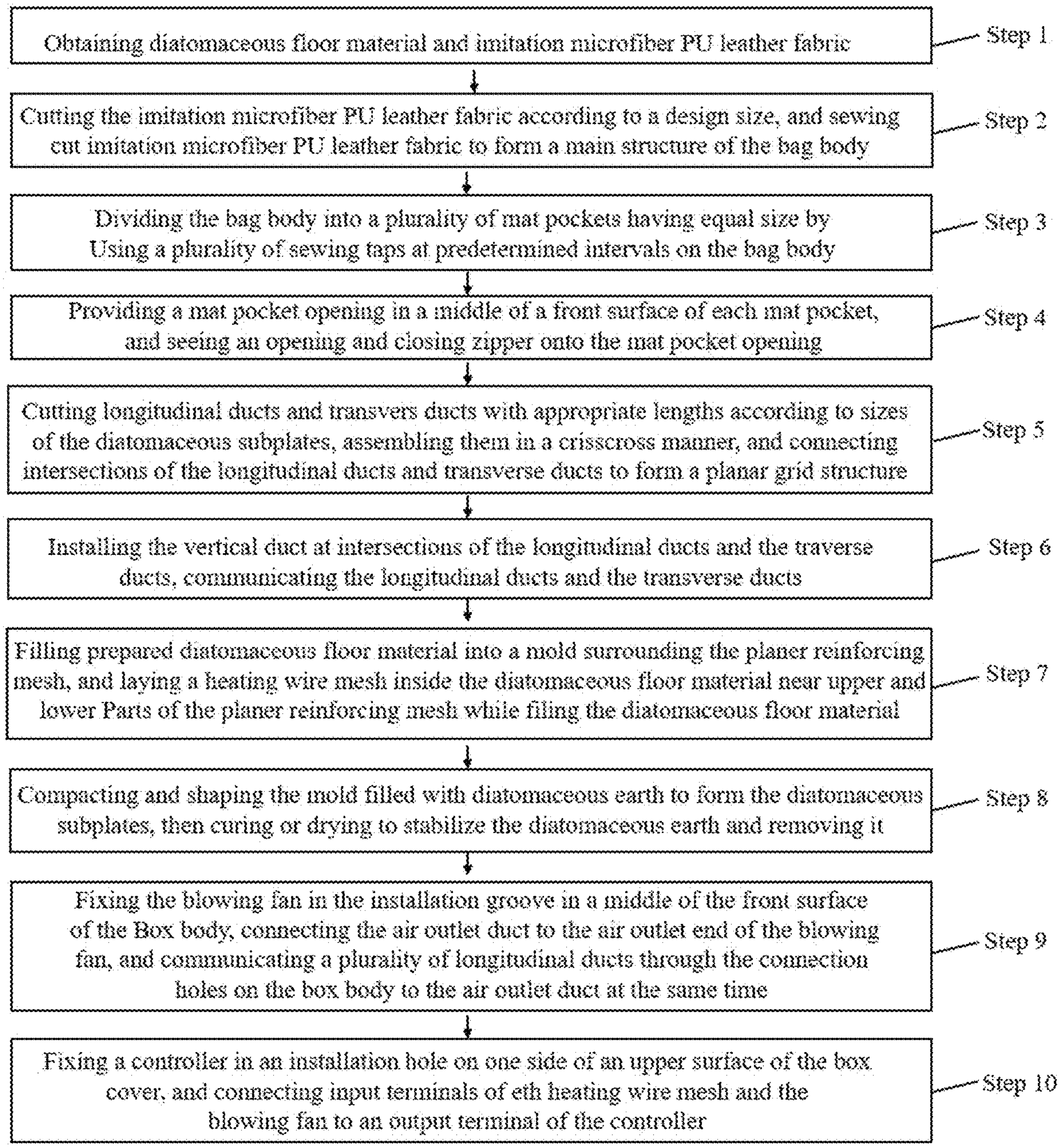
FIG. 8 is a schematic diagram of a process for preparing a foldable diatomaceous floor mat according to the present disclosure.

FIG. 8 is a schematic diagram of a process for preparing a foldable diatomaceous floor mat according to an embodiment of the present disclosure. It should be noted that if there are substantially identical results, the method of this application is not limited to the flow sequence shown in FIG. 8. As shown in FIG. 8, the method for preparing the foldable diatomaceous floor mat includes the following steps:

step 1: obtaining diatomaceous floor material and imitation microfiber PU leather fabric; where the diatomaceous floor material is a key component for floor mat to achieve the functionality (such as adsorption, humidity regulation, etc.). It is necessary to ensure its high quality, good physical and chemical properties, and purity to ensure that the floor mat can effectively function during use.

The imitation microfiber PU leather fabric requires consideration of the product's usage scenarios and style requirements. For modern minimalist style decoration, plain and delicate textured fabrics can be chosen. If used in a retro style, fabrics with textures and distressed effects can be selected, while ensuring good quality, wear resistance, and waterproofness to increase the product's lifespan.

Step 2: cutting the imitation microfiber PU leather fabric according to a design size, and sewing cut imitation microfiber PU leather fabric to form a main structure of the bag body 11; according to the pre-designed size and shape of the floor mat, professional cutting tools (such as cutting machines or sharp knives) are used for operation to ensure that edges of the fabric are neat and the size is accurate. During a sewing process, suitable sewing threads and machine needles are selected, and appropriate needle techniques (such as flat sewing, locksmithing, etc.) are used to ensure tight and secure stitching, thereby preventing the fabric from cracking or loosen during use, thus forming a complete bag body 11 and providing a storage space for internal components.

Step 3: dividing the bag body 11 into a plurality of mat pockets 13 having equal sizes by using a plurality of sewing tapes 12 at predetermined intervals on the bag body 11. The function of the sewing tapes 12 is to divide the bag body 11 into independent mat pockets 13, and the predetermined intervals should be determined according to the overall size of the floor mat and a designed folding method, to ensure that the size of each mat pocket 13 is appropriate and evenly distributed. At the same time, the sewing of the sewing tapes 12 also needs to ensure firmness, so that it can withstand certain tension and pressure, and will not easily deform or break during use, ensuring the stability of each mat pocket 13 and providing stable space for placing the diatomaceous subplates 14.

Step 4: providing a mat pocket opening 32 in a middle of a front surface of each mat pocket 13, and sewing an opening and closing zipper 33 onto the mat pocket opening 32; where an opening position of the mat pocket opening 32 should be convenient for the user to operate, facilitate the installation, replacement or maintenance of the diatomaceous subplates 14 in the future, and its size should match the opening and closing zipper 33 to ensure that the opening and closing zipper 33 can be installed and used smoothly. At the same time, the stitching of the opening and closing zipper 33 should be fine to ensure that teeth of the zipper can tightly bite, pull smoothly, and completely seal the mat pocket opening 32 in the closed state, thereby preventing the internal diatomaceous subplates 14 from loosening or falling off, while also playing a certain role in dust prevention and protection.

Step 5: cutting longitudinal ducts 16 and transverse ducts 17 with appropriate lengths according to sizes of the diatomaceous subplates 14, assembling them in a crisscross manner, and connecting intersections of the longitudinal ducts 16 and transverse ducts 17 to form a planar grid structure. In an implementation mode, based on the sizes and shapes of the diatomaceous subplates 14, required length of the longitudinal ducts 16 and the transverse ducts 17 are calculated to ensure complete coverage and support of the interiors of the diatomaceous subplates 14 after assembly. During an assembly process, appropriate connection methods (such as welding, bonding, or special duct fittings) should be used to tightly bind the intersections, thereby ensuring smooth gas flow in the duct and forming a stable planer grid to enhance the structural strength of the diatomaceous subplates 14 and prevent deformation or rupture during use.

Step 6: installing the vertical duct 20 at intersections of the longitudinal ducts 16 and the transverse ducts 17, communicating the longitudinal ducts 16 and the transverse ducts 17; where the installation of the vertical duct 20 further improves a three-dimensional structure of the planer reinforcing mesh 15, enhances the support capacity and stability of the diatomaceous subplates 14 in the vertical direction. During installation, it is necessary to ensure that the connection between the vertical duct 20 and the longitudinal ducts 16 and the transverse ducts 17 is tight, without leakage or loosening, so that the entire duct system forms a whole, thereby jointly providing comprehensive reinforcement support for the diatomaceous subplates 14.

Step 7: filling prepared diatomaceous floor material into a mold surrounding the planer reinforcing mesh 15, and laying a heating wire mesh 24 inside the diatomaceous floor material near upper and lower parts of the planer reinforcing mesh 15 while filling the diatomaceous floor material. In an implementation mode, when filling the diatomaceous floor material, it is necessary to ensure uniformity and compactness, avoid excessive voids or local accumulation, and ensure that diatomaceous earth can fully exert its function; simultaneously laying heating wire mesh 24 is to provide auxiliary heating function and accelerate drying speed when the floor mat is damp and needs to be dried. A laying position of the heating wire mesh 24 should be reasonable, close to the planer reinforcing mesh 15, which can ensure the heating effect without affecting a normal function of the diatomaceous earth. During a laying process, attention should be paid to avoiding damage or short circuit of heating wire mesh 24.

Step 8: compacting and shaping the mold filled with diatomaceous earth to form diatomaceous subplates 14, then curing or drying to stabilize the diatomaceous earth and remove it; where compaction and shaping operations can render the diatomaceous floor material to be bound tightly, obtain the required thickness and shape, improve the density and strength of the diatomaceous subplates 14, and control the pressure evenly during the compaction process to avoid inconsistent thickness or uneven surface. Curing or drying treatment is a key step in stabilizing the formation of diatomaceous floor materials. Suitable curing or drying methods (such as natural drying, heating drying, or chemical curing) should be selected based on the characteristics of the diatomaceous earth to ensure that it has sufficient strength and stability after forming, and can withstand various stresses in daily use.

Step 9: fixing the blowing fan 22 in the installation groove 21 in a middle of the front surface of the box body 18, connecting the air outlet duct 23 to the air outlet end of the blowing fan 22, and communicating a plurality of longitudinal ducts 16 through the connection holes 19 on the box body 18 to the air outlet duct 23 at the same time. The fixing of the blowing fan 22 should be firm to prevent vibration or displacement during operation. The design of the installation groove 21 should match the shape of the blowing fan 22 to ensure that it can be tightly installed and easy to maintain. A connection between the air outlet duct 23, the blowing fan 22, and the longitudinal ducts 16 should ensure good sealing to prevent gas leakage and ensure that the air blown by the fan can effectively pass through the duct system and blow to the mat pockets 13 outside the diatomaceous subplates 14, thereby achieving the function of rapid drying or ventilation of the bag body 11.

Step 10: fixing a controller 27 in an installation hole 26 on one side of an upper surface of the box cover 25, and connecting input terminals of the heating wire mesh 24 and the blowing fan 22 to an output terminal of the controller 27. Where the fixing of the controller 27 should be stable, and the size of the installation hole 26 should be appropriate to ensure that controller 27 can be accurately installed without shaking. During an electrical connection process, it is necessary to strictly follow circuit connection specifications to ensure correct and firm connection, avoid short circuits, open circuits and other problems, so that the controller 27 can accurately control the operation of the heating wire mesh 24 and the blowing fan 22, and achieve intelligent operation and functional control of the floor mat.

In an implementation mode, when a plurality of longitudinal ducts 16 are simultaneously passed through the connection holes 19 on the box body 18, a sealing ring 31 is provided on inner side walls of the connection holes 19, and the longitudinal ducts 16 are passed through the sealing ring 31, so that an inner wall of the sealing ring 31 is tightly adhered to outer side walls of the longitudinal ducts 16. Where when installing the sealing ring 31, it is necessary to ensure that the size of the sealing ring 31 is compatible with the connection holes 19 and the longitudinal ducts 16. Firstly, the sealing ring 31 is fixed on the inner side walls of the connection holes 19, and its installation position should be accurate, without any deviation or distortion. Then, the longitudinal ducts 16 slowly pass through the sealing ring 31. During this process, pay attention to maintaining the verticality of the longitudinal ducts 16 to avoid damaging the sealing ring 31 or causing poor sealing due to tilting. After the longitudinal ducts 16 completely pass through the sealing ring 31, check whether the inner wall of the sealing ring 31 is tightly attached to the outer side walls of the longitudinal ducts 16. If any gaps or loose fitting are found, the position of the longitudinal ducts 16 is adjusted or the sealing ring 31 is replaced in a timely manner to ensure the best sealing performance at the connection, thereby prevent water from entering the box body 18, and ensuring that the functional system of the entire diatomaceous earth mat can operate stably and efficiently.

In summary, the present embodiment provides a method for preparing a foldable diatomaceous floor mat. In terms of material selection, diatomaceous earth and imitation microfiber PU leather fabric are carefully selected for functionality and aesthetic durability, respectively. In the production process, precise and standardized cutting, sewing, assembly and other links ensure accurate dimensions and firm connections of each component. For example, the bag body 11, mat pockets 13, duct system, etc. are well made, which can effectively improve the structural strength and stability of the floor mat. In terms of functional design, the combination of heating wire mesh 24, blowing fan 22, and controller 27 achieves intelligent operation and fast drying and ventilation functions. Besides that, the sealing ring 31 is installed at a key connection point to further ensure system sealing and stability, enabling the floor mat to better meet user needs and extend its service life.

An embodiment provides another preparation method for a foldable diatomaceous floor mat, where the diatomaceous subplates 14 are made of fiber cement board, and the specific preparation process is as follows:

obtaining materials: obtaining diatomaceous floor materials and imitation microfiber PU leather fabrics, and preparing raw materials such as siliceous, calcareous materials, and plant fibers for the preparation of the fiber cement board (i.e. new diatomaceous subplates 14). Where the diatomaceous floor materials are key components for achieving the functionality of the floor mat (such as adsorption, humidity regulation, etc.), and it is necessary to ensure the high quality, good physical and chemical properties, and purity to ensure that the floor mat can effectively function during use. The imitation of microfiber PU leather fabric requires consideration of the product's usage scenarios and style requirements. For modern minimalist style decoration, plain and delicate texture fabrics can be chosen. If used in a retro style, fabrics with textures and distressed effects can be selected, while ensuring good quality, wear resistance, and waterproofness to increase the product's lifespan.

Preparing the bag body 11: cutting the imitation microfiber PU leather fabric according to a design size, and sewing cut imitation microfiber PU leather fabric to form a main structure of the bag body 11; in an implementation mode, according to pre-designed size and shape of the floor mat, professional cutting tools (such as cutting machines or sharp knives) are used for operation to ensure that edges of the fabric are neat and the size is accurate. During a sewing process, suitable sewing threads and machine needles are selected, and appropriate needle techniques (such as flat sewing, locksmithing, etc.) are used to ensure tight and secure stitching, preventing the fabric from cracking or loosen during use, thus forming a complete bag body 11 and providing a storage space for internal components.

Dividing the mat pockets 13: dividing the bag body 11 into a plurality of mat pockets 13 having same size at predetermined intervals using a plurality of sewing tapes 12 on the bag body 11. The function of the sewing tapes 12 is to divide the bag body 11 into independent mat pockets 13. The predetermined intervals should be determined based on the overall size of the floor mat and the designed folding method to ensure that each mat pocket 13 is of appropriate size and evenly distributed. At the same time, the sewing of the sewing tapes 12 also needs to ensure firmness, so that it can withstand certain tension and pressure, and will not easily deform or break during use, ensuring the stability of each mat pocket 13 and providing stable space for placing the diatomaceous subplates 14.

Providing a mat pocket opening 32 and installing a zipper: providing a mat pocket opening 32 in a middle of a front surface of each mat pocket 13, and sewing an opening and closing zipper 33 on the mat pocket opening 32. The opening position of the mat pocket opening 32 should be convenient for the user to operate, facilitate the installation, replacement or maintenance of the diatomaceous subplates 14 in the future, and its size should match the opening and closing zipper 33 to ensure smooth installation and use of the opening and closing zipper 33. At the same time, the stitching of the opening and closing zipper 33 should be fine to ensure that the teeth of the zipper can tightly bite, pull smoothly, and completely seal the mat pocket opening 32 in a closed state, preventing the internal diatomaceous subplates 14 from loosening or falling off, while also playing a certain role in dust prevention and protection.

The specific steps for preparing fiber cement board (diatomaceous subplate 14) are as follows.

Slurrying: using diatomaceous earth, siliceous and calcareous materials as main raw materials, adding plant fibers, etc., to make a uniform slurry through stirring and other operations. During a stirring process, the proportion of raw materials, stirring time and speed are strictly controlled to ensure that the slurry texture is uniform, and all components are fully integrated, thereby laying a foundation for the subsequent formation of high-quality fiber cement boards.

Papermaking: using a papermaking like papermaking process, the slurry is formed into a slab with a certain thickness and shape on a papermaking equipment. During operation, the parameters of the papermaking equipment are adjusted according to the design requirements to ensure that the thickness and shape of the slab meet the specifications of the diatomaceous subplates 14, so that the slab has preliminary structural strength.

Pressurization: the slab after papermaking is layered with steel plates and then pressurized using a 10000 ton press to squeeze out excess moisture, thereby increasing the density and strength of the slab. During a pressurization process, controlling the pressure magnitude and pressurization time to ensure sufficient water extrusion, and avoiding damage to the slab caused by excessive pressure, so as to effectively improve the physical properties of the slab.

Steam curing: placing pressurized board into a steam curing kettle for steam curing, so that it has good weather resistance and other properties. Temperature, pressure, and steam curing time of the steam curing kettle are strictly set according to the requirements of the steam curing process to ensure that the board undergoes sufficient physical and chemical reactions during the steam curing process, and improve its comprehensive performance.

Stacking: a suction cup of a hydraulic stacker crane sucks the raw materials into a stacking trolley to complete the stacking. During the operation, ensure that the suction force of the stacker crane suction cup is appropriate, and the raw materials will not fall or be damaged during the transfer process. The stacking is neat and convenient for subsequent operations.

Maintenance: a transport cart is used to transport the stacked raw materials into a maintenance process. During the maintenance process, based on the characteristics of the fiber cement board, temperature, humidity, and other conditions of the maintenance environment are controlled to ensure further stability and improvement of the board's performance.

Drying: after maintenance, the slab is dried to remove moisture. Suitable drying equipment and processes are selected, and the drying temperature and time are controlled to ensure complete removal of moisture, and avoiding deformation or cracking of the board due to improper drying.

Cutting: dried slab is cut into small pieces according to design requirements, thereby ensuring that the dimensions are consistent with the design dimensions of the diatomaceous subplates 14. During a cutting process, a high-precision cutting equipment is used to ensure accurate cutting dimensions, smooth edges, and meet the assembly requirements of the floor mat components.

Assembling a planer reinforcing mesh 15: based on sizes of the diatomaceous subplates 14 (fiber cement board), the longitudinal ducts 16 and the transverse ducts 17 with appropriate lengths are cut, them are assembled in a crisscross manner, so that the intersections of the longitudinal ducts 16 and the transverse ducts 17 are communicated to each other, thereby forming a planar grid structure. In an implementation mode, according to the size and shape of the diatomaceous subplates 14, required length of the longitudinal ducts 16 and the transverse ducts 17 are calculated to ensure that they can fully cover and support the interior of the diatomaceous subplates 14 after assembly. During an assembly process, appropriate connection methods (such as welding, bonding, or special duct fittings) should be used to tightly bind the intersections, ensuring smooth gas flow in the duct and forming a stable flat grid to enhance the structural strength of the diatomaceous subplates 14 and prevent deformation or rupture during use.

Installing a vertical duct 20: the vertical duct 20 is installed at intersections of the longitudinal ducts 16 and the transverse ducts 17, and it is communicated with the longitudinal ducts 16 and the transverse ducts 17. Where the installation of the vertical duct 20 further improves the three-dimensional structure of the planer reinforcing mesh 15, enhances the support capacity and stability of the diatomaceous subplates 14 in a vertical direction. During installation, it is necessary to ensure that the connection between the vertical duct 20 and the longitudinal ducts 16 and the transverse ducts 17 is tight, without leakage or loosening, so that the entire duct system forms a whole, and jointly providing comprehensive reinforcement support for the diatomaceous subplates 14.

Fixing a blowing fan 22 in the installation groove 21 in a middle of a front surface of the box body 18, connecting the air outlet duct 23 to an air outlet end of the blowing fan 22, and connecting a plurality of longitudinal ducts 16 through the connection holes 19 on the box body 18 to the air outlet duct 23 at the same time. Where the fixing of the blowing fan 22 should be firm so as to prevent vibration or displacement during operation. The design of the installation groove 21 should match the shape of the blowing fan 22 to ensure that it can be tightly installed and easy to maintain. The connection between the air outlet duct 23, the blowing fan 22, and the longitudinal ducts 16 should ensure good sealing to prevent gas leakage and ensure that the air blown by the blowing fan can effectively pass through the duct system and blow to the mat pockets 13 outside the diatomaceous subplates 14, thereby achieving the function of rapid drying or ventilation of the bag body 11.

Fixing a controller 27 in the installation hole 26 on one side of an upper surface of the box cover 25, and connecting input ends of the heating wire mesh 24 and the blowing fan 22 to an output end of the controller 27. Where, the fixing of the controller 27 should be stable, and the size of the installation hole 26 should be appropriate to ensure that the controller 27 can be accurately installed without shaking. During an electrical connection process, it is necessary to strictly follow the circuit connection specifications so as to ensure correct and firm connection, avoid short circuits, open circuits and other problems, so that the controller 27 can accurately control the operation of heating wire mesh 24 and the blowing fan 22, and achieve intelligent operation and functional control of the floor mat.

In summary, by replacing the diatomaceous subplates 14 with fiber cement board and incorporating a new preparation process, from material selection to manufacturing technology, to functional design and key component connection, the structural strength, stability, and comprehensive performance of the floor mat can be effectively improved, thereby better meeting user needs and extending its service life.

The above is only a specific embodiment of the present disclosure, but the protection scope of the present disclosure is not limited to this. Any skilled person familiar with the technical field can easily think of various changes or substitutions within the technical scope disclosed in the present disclosure, which should be included in the protection scope of the present disclosure. Therefore, the protection scope of the present disclosure should be based on the protection scope of the claimed claims.

What is claimed is:

1. A foldable diatomaceous floor mat, comprising a mat component, wherein the mat component comprises a bag body, sewing tapes, mat pockets, diatomaceous subplates, a planer reinforcing mesh, longitudinal ducts, transverse ducts, a box body, connection holes, a vertical duct, an installation groove, a blowing fan, and an air outlet duct;

an interior of the bag body is divided into a plurality of mat pockets by a plurality of sewing tapes, and inner walls of the plurality of mat pockets are all connected to the diatomaceous subplates;

an interior of the diatomaceous subplates is provided with the planer reinforcing mesh, and the planer reinforcing mesh is composed of a plurality of longitudinal ducts and a plurality of transverse ducts;

the plurality of longitudinal ducts and the plurality of transverse ducts are arranged in a crisscross manner, front surfaces of the diatomaceous subplates are fixedly connected to the box body, and an outer side wall of the box body is connected to fronts of inner side walls of the mat pockets;

a rear surface of the box body is provided with a plurality of connection holes, and front surfaces of the plurality of longitudinal ducts are respectively passed through interiors of the plurality of connection holes, rear surfaces of the plurality of longitudinal ducts are all penetrated through rear surfaces of the diatomaceous subplates, two ends of the plurality of transverse ducts are respectively penetrated through two sides of the diatomaceous subplates;

intersections of the longitudinal ducts and the transverse ducts are communicated to each other, intersections of the longitudinal ducts and the transverse ducts are communicated to the vertical duct;

two ends of the vertical duct are respectively penetrated through upper and lower surfaces of the diatomaceous subplates;

the installation groove is provided in a middle of a front surface of the box body, and an inner side wall of the installation groove is fixedly connected to the blowing fan, an air outlet end of the blowing fan is communicated to the air outlet duct, and front surfaces of the plurality of longitudinal ducts are all communicated to an outer side wall of the air outlet duct.

2. The foldable diatomaceous floor mat according to claim 1, wherein upper and lower parts of the diatomaceous subplates near the planer reinforcing mesh are provided with a heating wire mesh, and a box cover is fixedly connected to an upper surface of the box body;

one side of an upper surface of the box cover is provided with an installation hole, and an inner side wall of the installation hole is fixedly connected to a controller;

an input end of the heating wire mesh is electrically connected to an output end of the controller.

3. The foldable diatomaceous floor mat according to claim 2, wherein an input end of the blowing fan is electrically connected to the output end of the controller.

4. The foldable diatomaceous floor mat according to claim 2, wherein two sides of an upper surface of the controller are respectively provided with a blowing button and a heating button.

5. The foldable diatomaceous floor mat according to claim 2, wherein a charging power source is provided on one side of an inner side wall of the box cover away from the controller, and an output terminal of the charging power source is electrically connected to an input terminal of the controller.

6. The foldable diatomaceous floor mat according to claim 1, wherein a sealing ring is fixedly connected to inner side walls of the connection holes, an inner side wall of the sealing ring is attached to outer walls of the longitudinal ducts near one end of the air outlet duct.

7. The foldable diatomaceous floor mat according to claim 1, wherein middles of front surfaces of the mat pockets are provided with a mat pocket opening, an inner wall of the mat pocket opening is fixedly connected with an opening and closing zipper.

8. The foldable diatomaceous floor mat according to claim 1, wherein the bag body is made of ultra-fine elastic fibers that comprise imitation microfiber PU leather fabric.

9. A method for preparing a foldable diatomaceous floor mat, applied to the foldable diatomaceous floor mat according to claim 1, comprises the following steps:

step 1: obtaining diatomaceous floor material and imitation microfiber PU leather fabric;

step 2: cutting the imitation microfiber PU leather fabric according to a design size, and sewing cut imitation microfiber PU leather fabric to form a main structure of the bag body;

step 3: dividing the bag body into a plurality of mat pockets having equal size by using a plurality of sewing tapes at predetermined intervals on the bag body;

step 4: providing a mat pocket opening in a middle of a front surface of each mat pocket, and sewing an opening and closing zipper onto the mat pocket opening;

step 5: cutting longitudinal ducts and transverse ducts with appropriate lengths according to sizes of the diatomaceous subplates, assembling them in a crisscross manner, and connecting intersections of the longitudinal ducts and transverse ducts to form a planar grid structure;

step 6: installing the vertical duct at intersections of the longitudinal ducts and the transverse ducts, communicating the longitudinal ducts and the transverse ducts;

step 7: filling prepared diatomaceous floor material into a mold surrounding the planer reinforcing mesh, and laying a heating wire mesh inside the diatomaceous floor material near upper and lower parts of the planer reinforcing mesh while filling the diatomaceous floor material;

step 8: compacting and shaping the mold filled with diatomaceous earth to form the diatomaceous subplates, then curing or drying to stabilize the diatomaceous earth and removing it;

step 9: fixing the blowing fan in the installation groove in a middle of the front surface of the box body, connecting the air outlet duct to the air outlet end of the blowing fan, and communicating a plurality of longitudinal ducts through the connection holes on the box body to the air outlet duct at the same time;

step 10: fixing a controller in an installation hole on one side of an upper surface of the box cover, and connecting input terminals of the heating wire mesh and the blowing fan to an output terminal of the controller.

10. The method for preparing a foldable diatomaceous floor mat according to claim 9, wherein when the plurality of longitudinal ducts are simultaneously passed through the connection holes on the box body, a sealing ring is provided on inner side walls of the connection holes, and the longitudinal ducts are passed through the sealing ring, so that an inner wall of the scaling ring is tightly adhered to outer side walls of the longitudinal ducts.

* * * * *